United States Patent

Gieringer et al.

[15] 3,650,330
[45] Mar. 21, 1972

[54] SOD PICK-UP MACHINE

[72] Inventors: Robert G. Gieringer, 6508 N. Sunny Point Road; Robert H. Gieringer; William A. Gieringer, both of 5485 N. Port Washington Road, all of Milwaukee, Wis. 53217

[22] Filed: Aug. 6, 1969

[21] Appl. No.: 847,898

[52] U.S. Cl. ................................172/19, 37/102, 37/110
[51] Int. Cl. ..........................................A01b 45/04
[58] Field of Search ..............172/19, 20; 37/102, 110, 112

[56] References Cited

UNITED STATES PATENTS

| 3,429,377 | 2/1969 | Nunes | 172/19 |
|---|---|---|---|
| 3,470,634 | 10/1969 | Ulrich et al. | 37/110 |
| 3,509,944 | 5/1970 | Brouwer et al. | 172/19 |
| 792,331 | 8/1905 | Kerr et al. | 37/102 |
| 1,012,189 | 12/1911 | Blanchard | 37/102 |
| 2,199,239 | 4/1940 | Griffith et al. | 37/110 |
| 2,248,709 | 7/1941 | Jarmin | 37/110 |
| 2,676,423 | 4/1954 | Wooley | 37/102 |
| 2,756,661 | 7/1956 | Frisbie et al. | 172/20 |
| 2,814,889 | 12/1957 | Reisser | 37/110 |
| 2,998,081 | 8/1961 | Hartmangruber et al. | 172/20 |
| 3,053,328 | 9/1962 | Geipel | 172/19 |
| 3,164,211 | 1/1965 | Scott | 172/19 |
| 3,235,011 | 2/1966 | Pasinski et al. | 172/19 |

Primary Examiner—Robert E. Pulfrey
Assistant Examiner—C. W. Hanor
Attorney—Andrus, Sceales, Starke & Sawall

[57] ABSTRACT

A sod pick-up machine having a floating sod pick-up unit comprising independently pivotable elements including a tongue, inclined conveyor and sod hold-down wheel. A fixed conveyor cooperates with a hanging pivotal conveyor to roll a length of sod and move the latter downwardly to a transverse discharge conveyor. The hanging conveyor may be adjusted as to height. A separator plate permits downward movement of a sod roll over a length of flat sod. The discharge conveyor includes a channel having a rear curb wall and an adjustable front rail. Tandem wheels are mounted on arms which are pivotally mounted beneath the discharge conveyor. A separate tractor drives the machine and is connected thereto by a floating shock-absorbing system at the front and fixed pivot at the rear. Relative vertical movement is permitted at the front, and relative pivotal movement on a longitudinal axis is permitted.

6 Claims, 6 Drawing Figures

Patented March 21, 1972
3,650,330
2 Sheets-Sheet 1
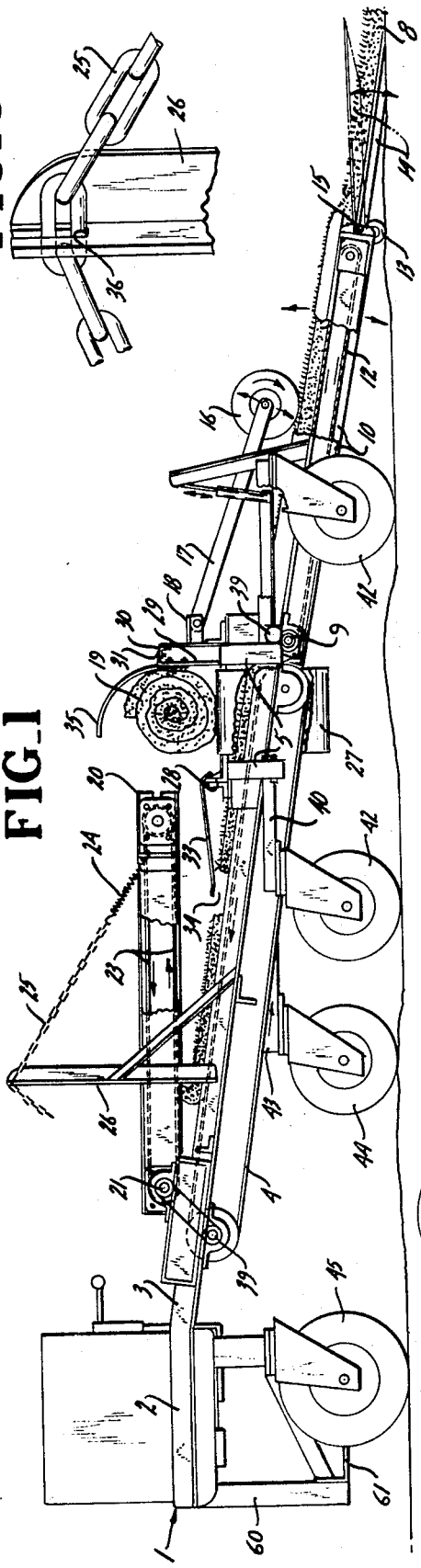
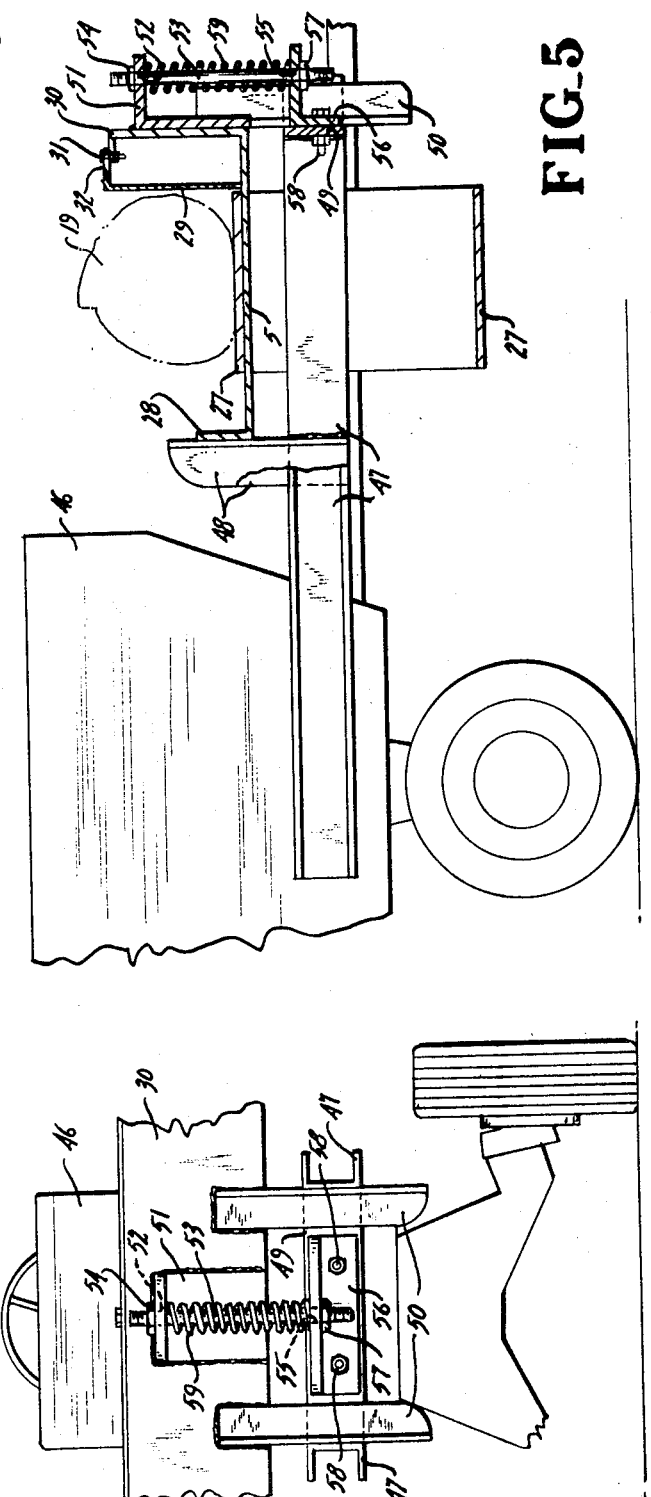
INVENTORS
ROBERT G. GIERINGER
ROBERT H. GIERINGER
WILLIAM A. GIERINGER
BY
Attorneys Patented March 21, 1972
3,650,330
2 Sheets-Sheet 2
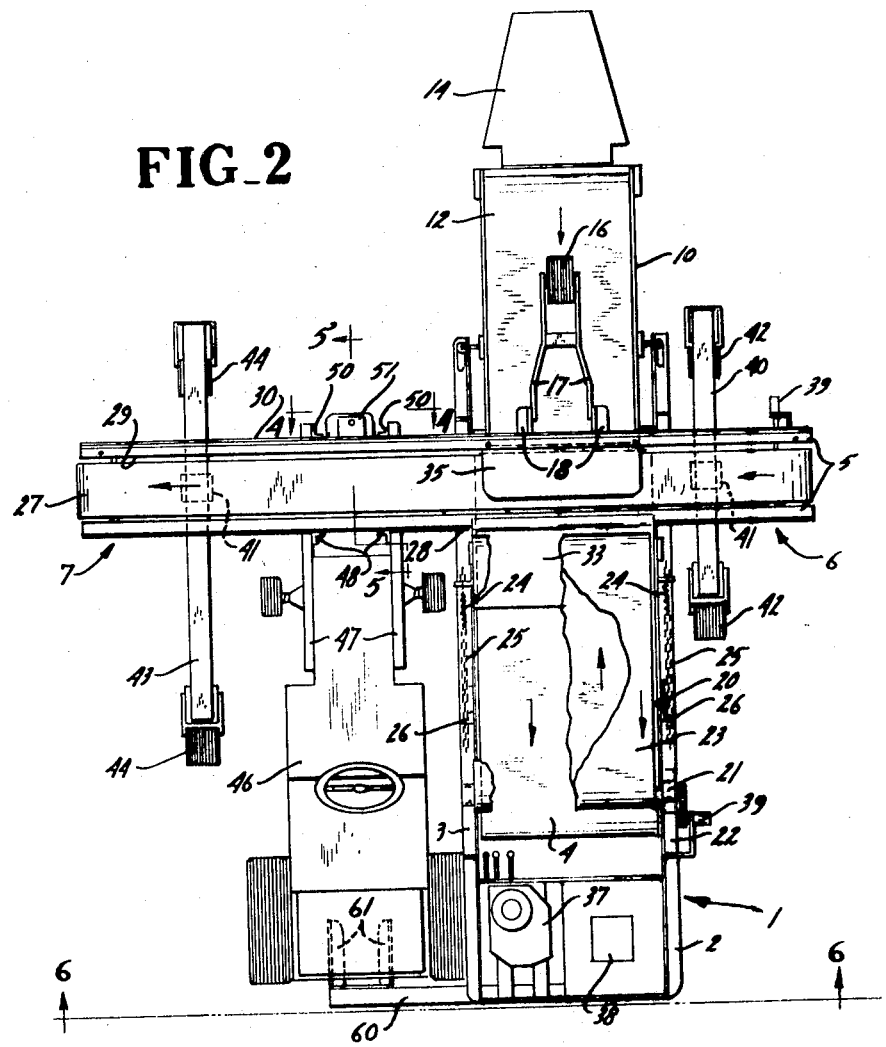
FIG_2
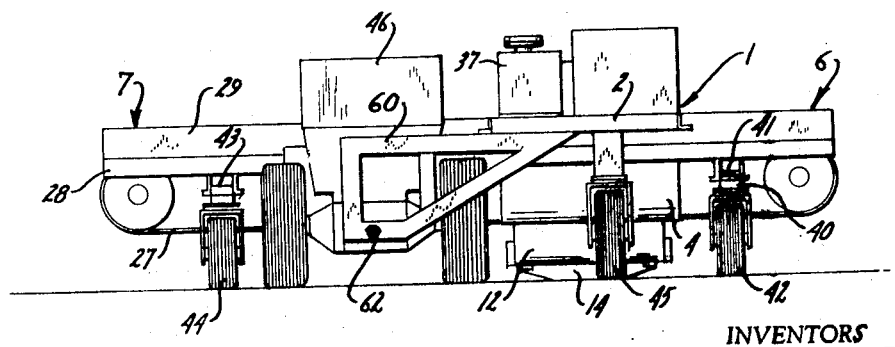
FIG_6
INVENTORS
ROBERT G. GIERINGER
ROBERT H. GIERINGER
WILLIAM A. GIERINGER
BY
Attorneys

SOD PICK-UP MACHINE

This invention relates to a sod pickup machine, and more particularly to a machine for picking up, rolling and discharging sod which has been precut into desired lengths in the field.

The machine of the invention includes novel sod handling and transfer means, as well as a unique motive power mounting system.

DESCRIPTION OF THE DRAWINGS

The accompanying drawings illustrate the best mode presently contemplated by the inventors for carrying out the invention.

In the drawings:

FIG. 1 is a side elevation of a device constructed in accordance with the invention, with parts broken away;

FIG. 2 is a top plan view of the device of FIG. 1, with parts broken away;

FIG. 3 is an enlarged fragmentary view showing the adjustment mechanism for the hanging conveyor;

FIG. 4 is a front view of the front connector mechanism, taken on line 4—4 of FIG. 2;

FIG. 5 is a longitudinal section taken on line 5—5 of FIG. 2; and

FIG. 6 is a rear view of the rear connector mechanism taken on line 6—6 of FIG. 2.

DESCRIPTION OF THE PREFERRED EMBODIMENT

As shown in the drawings, the sod pickup or harvesting machine comprises a main frame 1 having a generally rectangular rear portion 2. The parallel frame side rails extend forwardly from portion 2 and incline downwardly, as at 3, to form a support for a first inclined endless belt conveyor 4 which extends longitudinally and is fixed relative to frame 1. A secondary frame portion comprising a pair of spaced transverse rails 5 is secured to the forward ends of longitudinal rail portions 3. Rails 5 extend between portions 3 and include portions 6 and 7 which extend on either side of the secondary frame. As shown, portions 6 are relatively short while portions 7 are substantially longer than portions 6.

The secondary frame is adapted to mount a floating pickup device for lengths of sod 8 which has been precut in the field. For this purpose a pair of bearings 9 are mounted below the forwardmost rail 5 on rails 3 and pivotally support the rearward ends of a longitudinal conveyor frame 10. Frame 10 suitably mounts a second normally downwardly inclined endless belt conveyor 12 which pivots therewith. A transverse ground-engaging support roller 13 extends between the forward ends of frame 10, and the rear end of a sod pickup plate or tongue 14 is pivotally mounted to frame 10, as at 15, just above roller 13. In addition, a rollable sod holddown wheel 16 is mounted on a horizontal axis at the forward end of an arm 17, above conveyor 12. The rearward end of arm 17 is pivotally mounted to the forwardmost frame rail 5, as at 18. Gravity biases wheel 16 downwardly to hold sod in place on conveyor 12.

Conveyor 12, tongue 14 and wheel 16, all being independently pivotal from the rearward side, provide a floating sod pickup and transfer assembly which is flexible and rides up and down with undulations of the ground as the machine moves thereover.

Sod 8 which passes up the floating assembly is transferred to fixed conveyor 4 for forming into a sod roll 19. For this purpose, a longitudinal hanging conveyor assembly is mounted directly over conveyor 4 for cooperation therewith. This assembly comprises a frame 20 which is pivotally mounted at its rear end, as at 21 to supports 22 on main frame portions 3; and includes a third belt conveyor 23 thereon. The forward end of the assembly is normally resiliently supported against the force of gravity by a pair of flexible connectors comprising a length of spring 24 attached to the front end portion of frame 20 and a length of chain 25 between the spring 24 and an upstanding brace 26 mounted rearwardly on frame member 3.

The rear end portions of conveyors 4 and 23 converge, and the facing surfaces thereof are driven in opposite directions so that the upper end of a piece of sod 8 will be engaged by both conveyors, causing the sod to be rolled, with gradual downward movement. As this occurs, the sod rolls 19 will gradually lift conveyor 23 from a normally generally horizontal position to an upwardly inclined position.

The sod roll thus formed, and moving downward toward the front of the machine, is now ready for conveying for final discharge. For this purpose, transverse frame rails 5 support a fourth endless belt conveyor 27 which surrounds conveyor 4 and which is drivable in either direction for discharge on either side of the machine. Conveyor 27 forms a transverse channel having an upstanding rear curb wall 28 and an upstanding front rub rail 29 which is substantially higher than wall 28. Rail 29 is mounted for fore and aft adjustment on a support 30, as by bolts 31 and slots 32, to vary the width of the channel according to the diameter of the completed roll 19.

A fixed separator plate 33 extends rearwardly from the top of curb wall 28 to slightly above conveyor 4, forming a space 34. Plate 33 permits a completed sod roll to roll downwardly thereover from conveyor 4 to conveyor 27, while permitting a new piece of flat sod to move up through space 34.

In addition, means are provided to wedgingly receive a sod roll as it moves forwardly and downwardly onto conveyor 27, and to retain the flap end of the roll. For this purpose, an upstanding plate or guard 35 having a rearwardly curved upper end portion is mounted on rub rail 29 and above conveyor 27. Guard 35 is vertically adjustable on rail 29 to accommodate sod rolls of different diameters.

Since it is desirable for the sod roll to reach guard 35 with the flap end up, and since this depends on the point of commencement of sod rolling, this point is made adjustable by raising or lowering the normal hung position of hanging conveyor 23. For this purpose, braces 26 are provided with notches 36 wherein selected links of chains 25 may be locked.

After a sod roll 19 moves onto conveyor 27 and into engagement with guard 35, it moves down the conveyor, while confined between wall 28 and rail 29, until it is discharged therefrom.

The drive mechanism for the various conveyors is preferably self-contained, and may include a small gasoline powered motor 37 on frame portion 2, which in turn drives a similarly mounted hydraulic pump 38.

Pump 38 is connected through suitable hydraulic lines to a plurality of hydraulic motors 39 which are mounted on the various conveyors to drive them.

The entire mechanism is supported on a tandem wheel system. As shown, a wheel arm 40 is pivotally mounted at its center, as at 41, to frame rails 5, and closely adjacent conveyor 12. Arm 40 extends fore and aft of frame rails 5 and is provided at each end with a wheel 42 which can swivel in all directions. A similar arm 43 and wheels 44 are pivotally mounted as at 41 adjacent the outer end portion 7 of frame rails 5. Arms 40 and 43 can pivot in a vertical plane, with wheels 42 and 44 being independently swivelable, thus providing a substantial flexibility for driving and turning. In addition, a single swivelable wheel 45 is mounted beneath frame 2 for rear support.

In accordance with the invention, a separate power motive means for driving the machine across the field is contemplated, with the machine being floatingly connected thereto. This power means may comprise a small tractor 46 or other similar unit which is small enough to fit behind conveyor 27 and between wheel arm 43 and conveyor 4. Tractor 46 is provided with a suitable frame at its front and rear for connection to the sod pickup machine.

The forward tractor frame portion includes a pair of spaced longitudinal rails 47 having a pair of centrally positioned transversely spaced upstanding pusher bars 48 thereon. In addition, a connector plate 49 extends between the forward ends of rails 47. A pair of transversely spaced beams 50 extend downwardly from forwardmost frame rail 5.

When tractor 46 is in driving position, pusher bars 48 will be in engagement with curb wall portion 28 of rail 5, and plate 49 will be in engagement with beams 50 to move the machine forward.

A further front connector means is provided which absorbs shocks due to relative vertical movement between the pickup machine and tractor and which tends to overcome any upward lifting forces on the front end of the tractor. For this purpose, an upper L-shaped bracket 51 is secured to portion 31 of frame 5, with an opening 52 in the horizontal bracket lug. A spring support rod 53 extends through opening 52 and is hung from bracket 51, as by a threaded nut 54. The lower end of rod 53 extends through an opening 55 in a lower L-shaped bracket 56, which is hung from rod 53, as by a threaded nut 57. Bracket 56 also includes openings which mate with openings in connector plate 49 and bolts 58 extend through the openings to connect the units together. Brackets 51 and 56 are so positioned that a vertical spring 59 on rod 53 which extends between the brackets provides the shock-absorbing function.

The above-described connector also permits relative tilting or pivoting on a longitudinal axis between the pickup unit and tractor.

In addition, a rear connector is provided and comprises a lateral extension 60 of rear frame 2, a rear tractor frame portion 61 and a fixed pivotal connection therebetween, as by bolt 62. This structure also permits the relative tilting or pivoting on a longitudinal axis. Furthermore, frame portion 61 engages extension 60 to push the pickup machine rearwardly when desired.

The front and rear connectors permit relative vertical floating movement of the front of the combined unit, while preventing such movement at the rear. The weight of the combined unit is distributed over the five pickup device wheels and the tractor wheels to thereby permit the unit to be drawn either on or off the sod during pick up without damaging the sod.

In addition, by mounting tandem wheel arms 40 and 43 for central pivoting beneath conveyor 27, it has been found that conveyor 27 stays level and the front edge of tongue 14 does not tilt out of a horizontal plane when wheels 42 go over rough terrain.

The machine of the invention has been found to be very versatile. It not only is easy to handle, but permits sod pick up right to the end of a row.

Various modes of carrying out the invention are contemplated by the inventors.

The following claims particularly point out and distinctly claim the subject matter which is regarded as the invention.

We claim:

1. In a sod pickup machine, the combination comprising:
  a. a mobile frame,
  b. rolling means carried by said frame for receiving a length of flat sod and forming it into a sod roll,
  c. and vertically movable floating means for picking up a length of flat sod from a field and delivering it to said rolling means, said floating means comprising:
    1. a longitudinal inclined conveyor means pivotally mounted at its rearward end on a horizontal transverse axis to said frame and adjacent said rolling means,
    2. means on said conveyor means to support the forward end thereof upon the ground from which the sod is taken, and
    3. a platelike sod engaging pickup tongue extending forwardly from said conveyor means in substantial alignment therewith and pivotally mounted at its rearward end on a horizontal transverse axis to the forward end of said conveyor means adjacent said support, said tongue extending forwardly a substantial distance ahead of said conveyor means with the pivotal mounting of the tongue serving as a hinge joint between the same and said floating conveyor means to allow said tongue to follow the contour of the ground.

2. The machine of claim 1 which includes:
  a. a transverse conveyor mounted on and supporting the forward end of said frame adjacent the rearward end of said longitudinal inclined conveyor for receiving and discharging a formed sod roll from said rolling means,
  b. and a pair of transversely spaced tandem assemblies for supporting said machine on the ground, each said tandem assembly comprising:
    1. a longitudinally extending arm which is centrally pivotal beneath said transverse conveyor on a transverse axis parallel to and adjacent said first named pivotal mounting,
    2. and a swivelable wheel supporting each end of said arm.

3. The machine of claim 1 which includes:
  a. a sod holddown assembly disposed above said conveyor and comprising:
    1. an arm pivotally mounted at its rear end to said frame and extending forwardly therefrom to overlie said floating conveyor means,
    2. and a sod engaging roller disposed at the forward end of said arm to ride upon the sod on said floating conveyor.

4. In a sod pick up machine, the combination comprising:
  a. a frame,
  b. rolling means for receiving a length of flat sod and forming it into a sod roll,
  c. and vertically movable floating means for picking up a length of flat sod from a field and delivering it to said rolling means, said floating means comprising:
    1. a longitudinal inclined conveyor freely pivotally mounted at its rearward end to said frame and adjacent said rolling means,
    2. a platelike sod engaging pickup tongue extending forwardly from said conveyor and freely pivotally mounted at its rearward end to the forward end of said conveyor,
  d. said rolling means comprising:
    1. a second longitudinal inclined conveyor mounted to said frame in line with said first-named conveyor,
    2. a third conveyor vertically pivotally mounted at its rear end adjacent the rear end of said second conveyor, said third conveyor extending forwardly and upwardly from said second conveyor,
    3. and means to drive said third conveyor in an opposite direction from said second conveyor so that engagement of said last-named conveyors by a sod edge will cause said sod to roll up therebetween and move forwardly,
  e. at least one upstanding brace on said frame,
  f. an interconnected chain and spring secured between said brace and the forward portion of said third conveyor for resiliently hanging the latter so that it will pivotally raise as a sod roll is formed,
  g. and means to receive a formed sod roll from said rolling means.

5. In a sod pickup device, the combination comprising:
  a. a frame having a longitudinal portion and a forwardly mounted transverse portion,
  b. vertically movable floating means on said longitudinal frame portion for picking up a length of flat sod from a field,
  c. rolling means on said longitudinal frame portion for receiving a length of flat sod from said floating means and forming it into a sod roll,
  d. means on said transverse frame portion for receiving a sod roll from said rolling means and discharging the roll,
  e. separate motive means,
  f. front means to floatingly connect said motive means and said transverse frame portion so that relative vertical movement as well as pivotal movement on a longitudinal axis can occur therebetween, said front floating connection means comprising:
    1. a pair of spaced rails extending forwardly from said motive means, 2. pusher means on said rails for engaging said transverse frame portion,
3. and a tensioned vertical spring connected between said transverse frame portion and said rails to cushion relative vertical movement therebetween, g. and rear means to connect said motive means and the rear of said longitudinal frame portion so that they are fixed against relative vertical movement, but can pivot relatively on a longitudinal axis.

6. The combination of claim 13 wherein said rear connection means (g) comprises a fixed pivotal mounting means.

* * * * *

UNITED STATES PATENT OFFICE
CERTIFICATE OF CORRECTION

Patent No. 3,650,330   Dated March 21, 1972

Inventor(s)   Gieringer et al

It is certified that error appears in the above-identified patent and that said Letters Patent are hereby corrected as shown below:

Column 4, lines 23 to 73, Claim 4 as it appears in the patent is incorrect and should be changed to read as follows:

---The machine of claim 1 which includes:
    (a) sod rolling means comprising:
        (1) a second longitudinal inclined conveyor mounted to said frame in line with said first named conveyor to receive a strip of sod therefrom,
        (2) a third conveyor vertically pivotally mounted on said frame at its rear end adjacent the rear end of said second conveyor, said third conveyor extending forwardly and upwardly from said second conveyor and overlying the same,
        (3) and means to drive said third conveyor in an opposite direction from said second conveyor so that engagement of said last-named conveyors by a sod edge will cause said sod to roll up therebetween and move forwardly,
    (b) means to resiliently support the forward end of said third conveyor and to permit the same to ride freely upon the roll of sod as the latter is forming,
    (c) and means to receive a formed sod roll from said rolling means and to discharge the same from said machine.---

Column 6, line 4, Claim 6, after "claim" cancel "13" and substitute therefor ---5---

Signed and sealed this 26th day of December 1972.

(SEAL)
Attest:

EDWARD M. FLETCHER, JR.
Attesting Officer

ROBERT GOTTSCHALK
Commissioner of Patents